(12) United States Patent
Jain et al.

(10) Patent No.: US 8,971,944 B2
(45) Date of Patent: Mar. 3, 2015

(54) METHOD AND DEVICES OF COMMUNICATING PHYSICAL CELL IDENTIFIER INFORMATION TO MOBILE STATIONS

(75) Inventors: Nitin Jain, Bangalore (IN); Venkata Raju Indukuri, Bangalore (IN)

(73) Assignee: Samsung Electronics Co., Ltd (KR)

( * ) Notice: Subject to any disclaimer, the term of this patent is extended or adjusted under 35 U.S.C. 154(b) by 493 days.

(21) Appl. No.: 13/346,269

(22) Filed: Jan. 9, 2012

(65) Prior Publication Data

US 2012/0178490 A1 Jul. 12, 2012

(30) Foreign Application Priority Data

Jan. 7, 2011 (IN) ................ 50/CHE/2011

(51) Int. Cl.
- *H04B 7/00* (2006.01)
- *H04W 8/26* (2009.01)
- *H04W 28/04* (2009.01)
- *H04W 48/08* (2009.01)
- *H04W 88/08* (2009.01)

(52) U.S. Cl.
CPC ............... *H04W 8/26* (2013.01); *H04W 28/04* (2013.01); *H04W 48/08* (2013.01); *H04W 88/08* (2013.01)
USPC ........... 455/517; 455/424; 455/436; 370/252; 370/331

(58) Field of Classification Search
CPC ... H04W 24/02; H04W 84/045; H04W 16/14; H04W 36/0061; H04W 36/0083; H04W 36/08; H04W 48/20; H04W 72/005; H04W 72/0453; H04W 72/1289; H04W 76/021; H04W 88/10; H04W 92/20; H04J 11/0093; H04J 11/0069; H04L 61/2046

USPC ........... 455/418, 434, 456.1, 517, 422.1, 446, 455/436–444, 423–425; 370/331, 332, 328, 370/329, 335, 441, 336, 320, 252
See application file for complete search history.

(56) References Cited

U.S. PATENT DOCUMENTS

| | | | |
|---|---|---|---|
| 2009/0047956 A1* | 2/2009 | Moe et al. ................ | 455/436 |
| 2011/0038326 A1* | 2/2011 | Davies et al. ............. | 370/329 |
| 2012/0039233 A1* | 2/2012 | Kim et al. ................. | 370/312 |
| 2013/0010619 A1* | 1/2013 | Fong et al. ................ | 370/252 |
| 2013/0115959 A1* | 5/2013 | Amirijoo et al. .......... | 455/440 |
| 2013/0130682 A1* | 5/2013 | Awad et al. ............... | 455/434 |
| 2014/0071891 A1* | 3/2014 | Zhou et al. ................ | 370/328 |
| 2014/0080468 A1* | 3/2014 | Zhang et al. .............. | 455/418 |

* cited by examiner

*Primary Examiner* — Sujatha Sharma
(74) *Attorney, Agent, or Firm* — The Farrell Law Firm, P.C.

(57) ABSTRACT

The present invention provides a method and system for communicating physical cell identifier information to mobile stations. In one embodiment, a method includes detecting a need to change a physical cell identifier associated with a cell in a telecommunication network used for serving the mobile station. The method also includes communicating physical cell identifier information to the mobile station based on the detected need to change the physical cell identifier. The method includes employing another physical cell identifier associated with the cell based on the communicated physical cell identifier information. The physical cell identifier information is communicated in one or more modification periods such that said another physical cell identifier is employed by the base station and the mobile station at a boundary of one of the modification periods. Moreover, the method includes continue serving the mobile station based on the employed said another physical cell identifier.

30 Claims, 5 Drawing Sheets

METHOD AND DEVICES OF COMMUNICATING PHYSICAL CELL IDENTIFIER INFORMATION TO MOBILE STATIONS

FIELD OF THE INVENTION

The present invention relates to the field of telecommunication, and more particularly relates to communicating physical cell identifier information to mobile stations.

BACKGROUND OF THE INVENTION

A home base station is a small radio base station, also known as a "Femto base station," "pico base station," or "micro base station" in some contexts. The coverage area for the home base station is relatively small as compared to a cell covered by a standard macro radio base station. The end users can move home base stations geographically from place to place without the operator being able to control relocation of the home base station.

Home base stations may determine their own operating frequency and physical cell identifier. Due to this, it is possible that one or more home base stations and macro base stations end-up having the same physical cell identifier and frequency in the same area leading to interference among cells.

On determination of the above situation, a home base station may be required to change its operating parameters like physical cell identifier/frequency to avoid high level interference. However, a mobile station being served by the home base station may not be aware that the home base station has changed the physical cell identifier. Consequently, the mobile station performs autonomous search for the serving home base station and may fail in locating the serving home base station leading to a communication failure with the home base station and also loss of battery power of the mobile station. Subsequently, the mobile station performs a re-association procedure with other home base station or a macro base station in its proximity. This may cause delay in resumption of service to the mobile station.

One of the currently known systems enables a serving home base station to provide physical cell identifier information to associated mobile stations. The serving home base station specifically sends a message which includes physical cell identifier information and a time stamp to each of the associated mobile stations. The time stamp in the message indicates when the serving home base station is going to use a new physical cell identifier so that the associated mobile stations can use the new physical cell identifier to communicate with the home base station. Further, one or more mobile stations may receive the message from the serving home base station if one or more mobile stations are in connected mode. On the contrary, mobile stations which are not in connected mode may not receive any notification message. Even if the one or more mobile stations are in connected mode, there may be delay in receiving the message by the one or more mobile stations and hence delay may be caused in using the new physical cell identifier indicated in the message by the one or more mobile stations. As a result, the one or more mobile stations may experience failure in a radio link with the serving home base station.

SUMMARY OF THE INVENTION

The present invention provides a method and devices for communicating physical cell identifier information to mobile stations. In one aspect, a method of a base station for communicating physical cell identifier information to a mobile station includes detecting a need to change a physical cell identifier associated with a cell in a telecommunication network used for serving at least one mobile station, and communicating physical cell identifier information to the at least one mobile station based on the detected need to change the physical cell identifier. The method also includes employing another physical cell identifier associated with the cell in the telecommunication network based on the physical cell identifier information communicated to the at least one mobile station, where the physical cell identifier information is communicated in one or more modification periods, and where said another physical cell identifier is employed at a boundary of one of the one or more modification periods. The method further includes continue serving the at least one mobile station based on the employed said another physical cell identifier.

In another aspect, a base station of a telecommunication network for communicating physical cell identifier information associated with a cell to at least one mobile station includes a processor, and memory coupled to the processor and temporarily configured to store instructions capable of performing the method described above.

In yet another aspect, a method of a mobile station for processing physical cell identifier information associated with a cell in a telecommunication network includes receiving physical cell identifier information indicating a change of a physical cell identifier associated with the cell in the telecommunication network from a base station of the telecommunication network, where the mobile station is served by the base station using the physical cell identifier. The method further includes employing another physical cell identifier associated with the cell in the telecommunication network based on the received physical cell identifier information, where the physical cell identifier information is received in one or more modification periods, and where the said another physical cell identifier is employed at a boundary of one of the one or more modification periods. Moreover, the method includes detecting the base station using the employed said another physical cell identifier.

In a further aspect, a mobile station for processing physical cell identifier information associated with a cell in a telecommunication network includes a processor, and memory coupled to the processor and temporarily configured to store instructions capable of performing the method described above.

Other features of the embodiments will be apparent from the accompanying drawings and from the detailed description that follows.

BRIEF DESCRIPTION OF THE ACCOMPANYING DRAWING

The drawings described herein are for illustration purposes only and are not intended to limit the scope of the present disclosure in any way.

DETAILED DESCRIPTION OF THE INVENTION

The present invention provides a method and devices for communicating physical cell identifier information to mobile stations. In the following detailed description of the embodiments of the invention, reference is made to the accompanying drawings that form a part hereof, and in which are shown by way of illustration specific embodiments in which the invention may be practiced. These embodiments are described in sufficient detail to enable those skilled in the art to practice the invention, and it is to be understood that other embodiments may be utilized and that changes may be made without departing from the scope of the present invention. The following detailed description is, therefore, not to be taken in a limiting sense, and the scope of the present invention is defined only by the appended claims.

Figure 1:
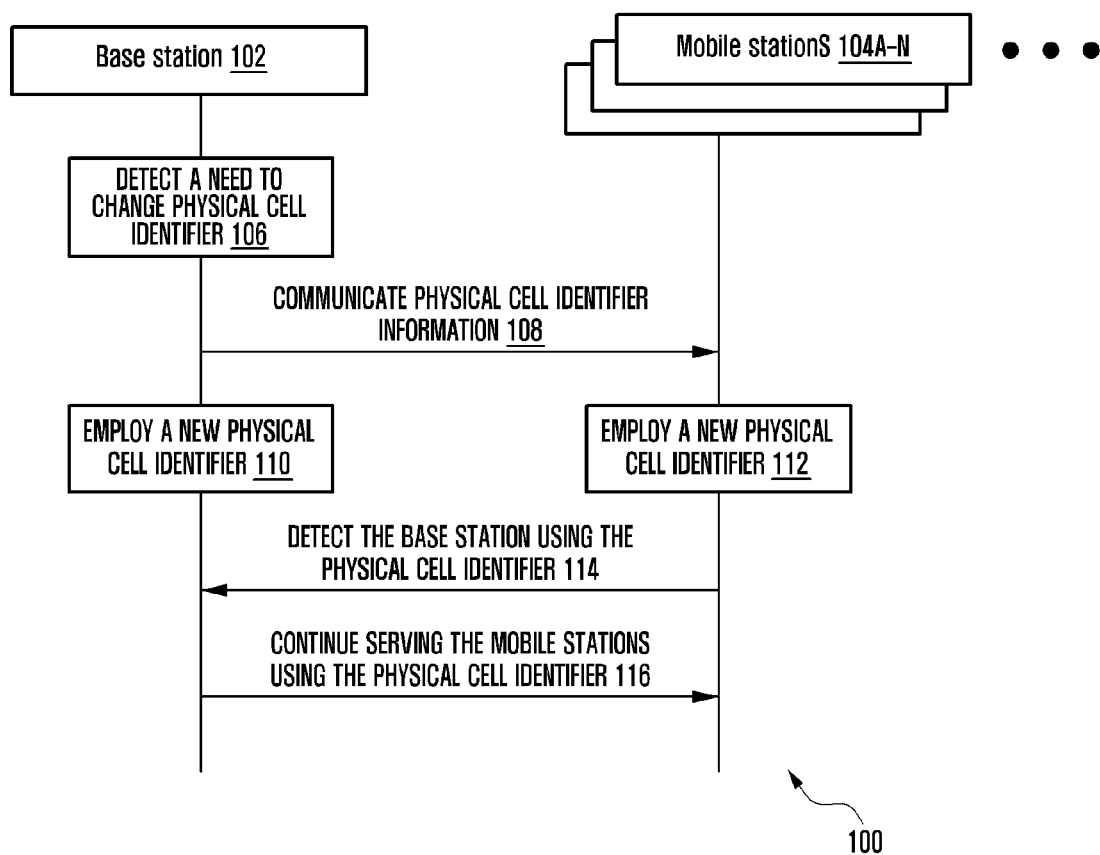
FIG. 1 illustrates a flow diagram illustrating an exemplary method of communicating physical cell identifier information by a base station to mobile stations, according to one embodiment.

FIG. 1 illustrates a flow diagram 100 illustrating an exemplary method of communicating physical cell identifier information by a base station 102 to mobile station 104A-N, according to one embodiment. At step 106, a base station (e.g., a home base station, femto base station, macro base station, pico base station, etc.) determines a need to change a physical cell identifier associated with a cell in a telecommunication network. The physical cell identifier is currently used by the base station for serving mobile stations 104A-N. At step 108, the base station 102 communicates physical cell identifier information to the mobile stations 104A-N based on the detected need to change the currently used physical cell identifier. The physical cell identifier information may include a frequency information, and/or one of physical cell identifier and a primary scrambling code. In one embodiment, the base station communicates the physical cell identifier information associated with a new physical cell identifier in one or more modification periods.

Accordingly, the base station 102 and the mobile stations 104A-N substantially simultaneously employs the new physical identifier associated with the cell. In one embodiment, the base station 102 and the mobile stations 104A-N employs the new physical cell identifier at the boundary of one of the modification periods. Therefore, the mobile stations 104A-N detects the base station 102 using the employed physical cell identifier associated with the cell. The base station 102 thus continues to serve the mobile stations 104A-N using the employed identifier without any disruption of service. Moreover, a non-transitory computer-readable storage medium having instructions to communicate physical cell identifier information by a base station 102 to mobile station 104A-N stored therein, that when executed by the base station 102, result in execution of the method of FIG. 1.

Figure 2:
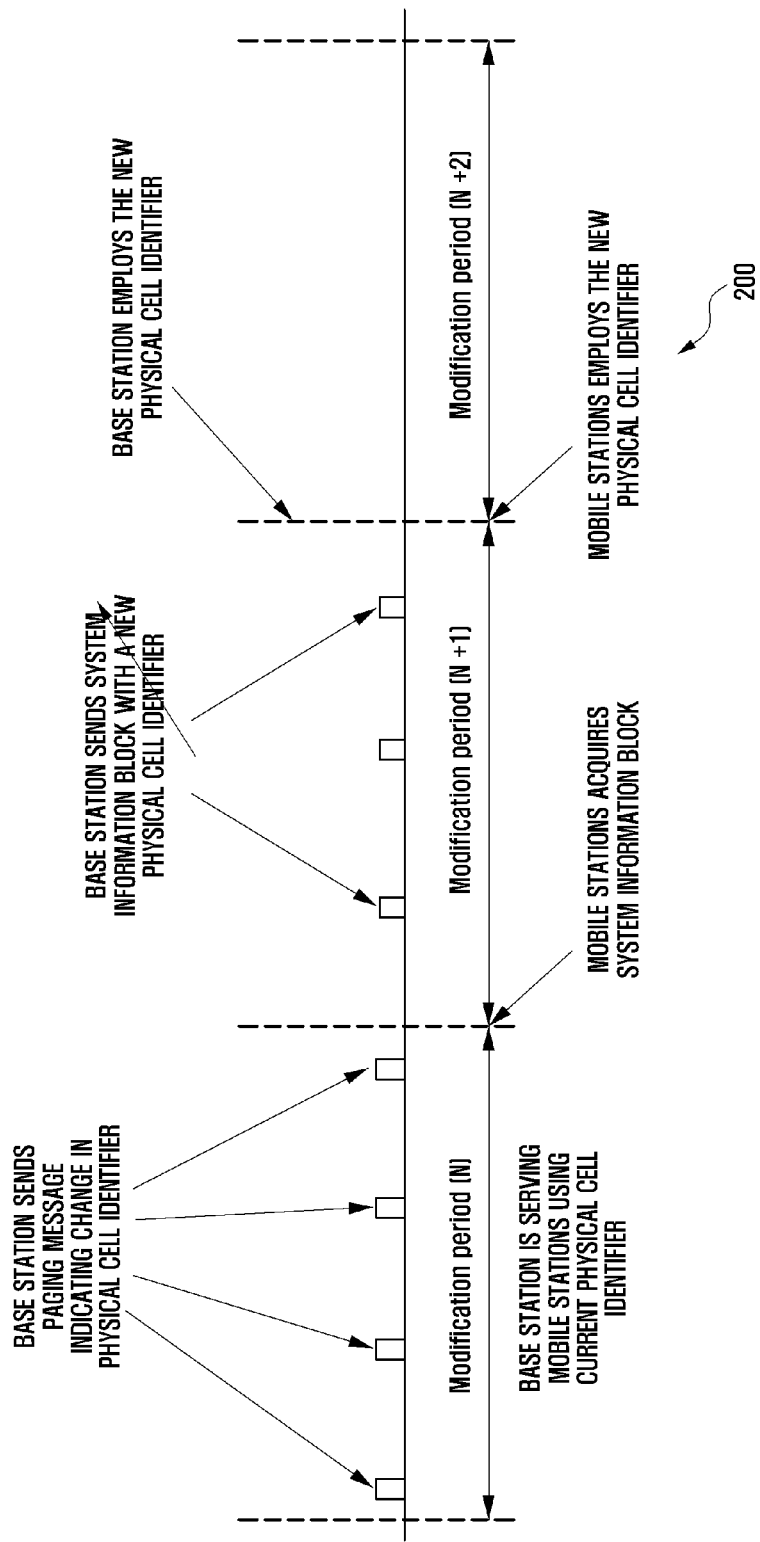
FIG. 2 is a schematic representation illustrating steps of changing a physical cell identifier simultaneously by the base station and the mobile stations, according to one embodiment.

FIG. 2 is a schematic representation 200 illustrating steps of changing a physical cell identifier simultaneously by the base station 102 and the mobile stations 104A-N, according to one embodiment. In FIG. 2, the base station 102 generates a paging message indicating a change in system information when a need to change the currently used physical cell identifier is detected. The base station 102 then sends the paging message indicating the change in the system information to the mobile stations 104A-N during a modification period (N). It can be noted that, at this point of time, the base station 102 and the mobile stations 104A-N are using the same physical cell identifier.

Further, the base station 102 generates a system information block including a new physical cell identifier based on the change in the system information. In one exemplary implementation, a new physical cell identifier is included in a new information element of the system information block. The base station 102 transmits the system information block including the new physical cell identifier to the mobile stations during a modification period (N+1) substantially following the modification period (N). Each of the mobile stations 104A-N acquires the system information block including the new physical cell identifier during the modification period (N+1). Finally, the base station 102 and the mobile stations 104A-N uses the new physical cell identifier associated with the cell in the telecommunication network from the end of the modification period (N+1) (i.e., from the beginning of a modification period (N+2) substantially following the modification period (N+1).

Figure 3:
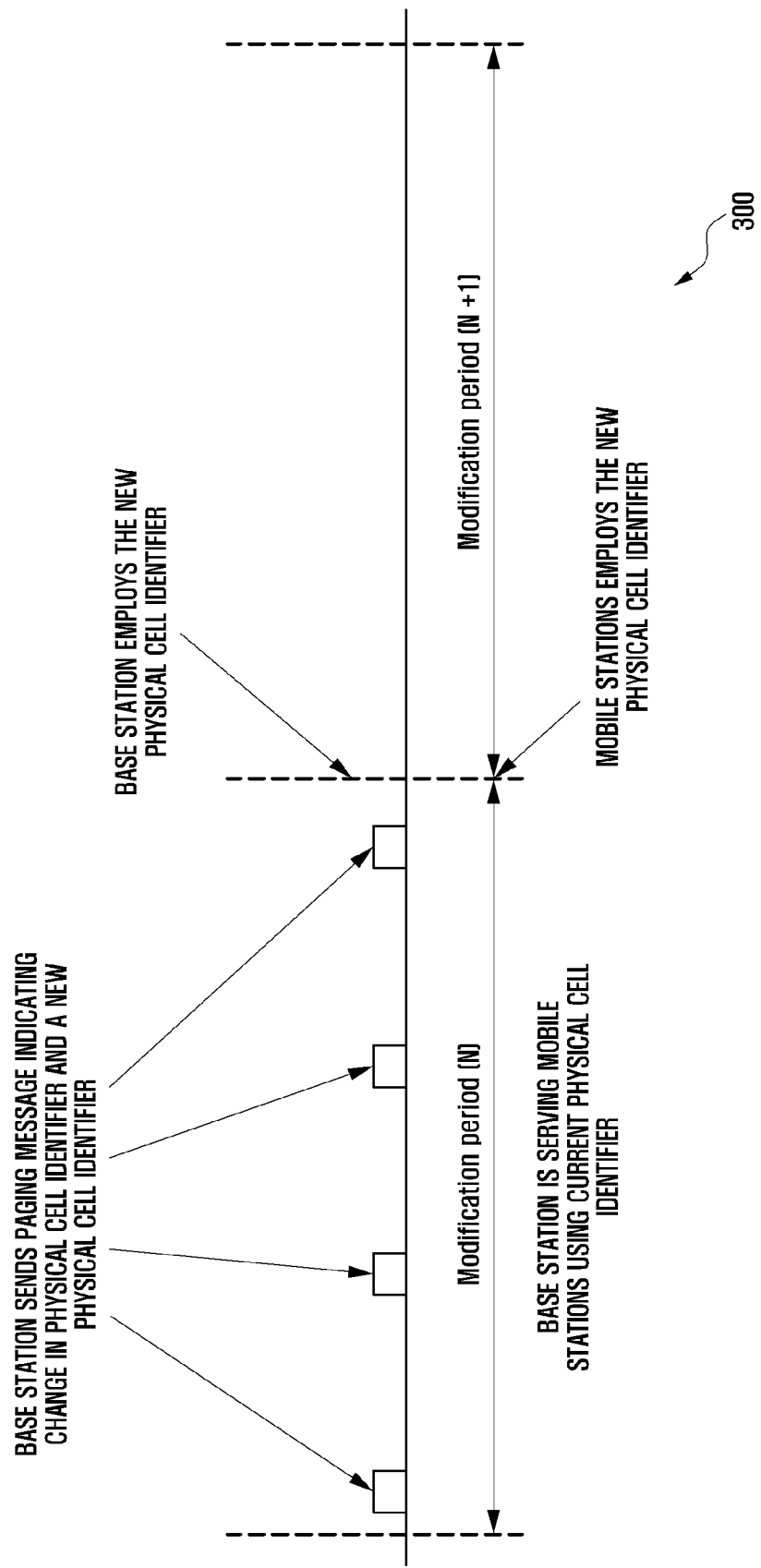
FIG. 3 is a schematic representation illustrating steps of changing a physical cell identifier simultaneously by the base station and the mobile stations, according to another embodiment.

FIG. 3 is a schematic representation 300 illustrating steps of changing a physical cell identifier simultaneously by the base station 102 and the mobile stations 104A-N, according to another embodiment. In FIG. 3, the base station 102 generates a paging message indicating a change in the currently used physical cell identifier associated with a cell and including a new physical cell identifier associated with the cell when a need to change the currently used physical cell identifier is detected. In one exemplary implementation, the change in currently used physical cell identifier and including the new physical cell identifier is included in a paging cause or a new bit of the paging message. The base station 102 then sends the paging message indicating the change in currently used physical cell identifier and including the new physical cell identifier to the mobile stations 104A-N during a modification period (N). It can be noted that, at this point of time, the base station 102 and the mobile stations 104A-N are using the currently used physical cell identifier.

Each of the mobile stations 104A-N acquires the paging message during the modification period (N). The base station 102 and the mobile stations 104A-N employs the new physical cell identifier associated with the cell from the end of the modification period (N) (i.e., from beginning of a modification period (N+1) substantially following the modification period (N).

Figure 4:
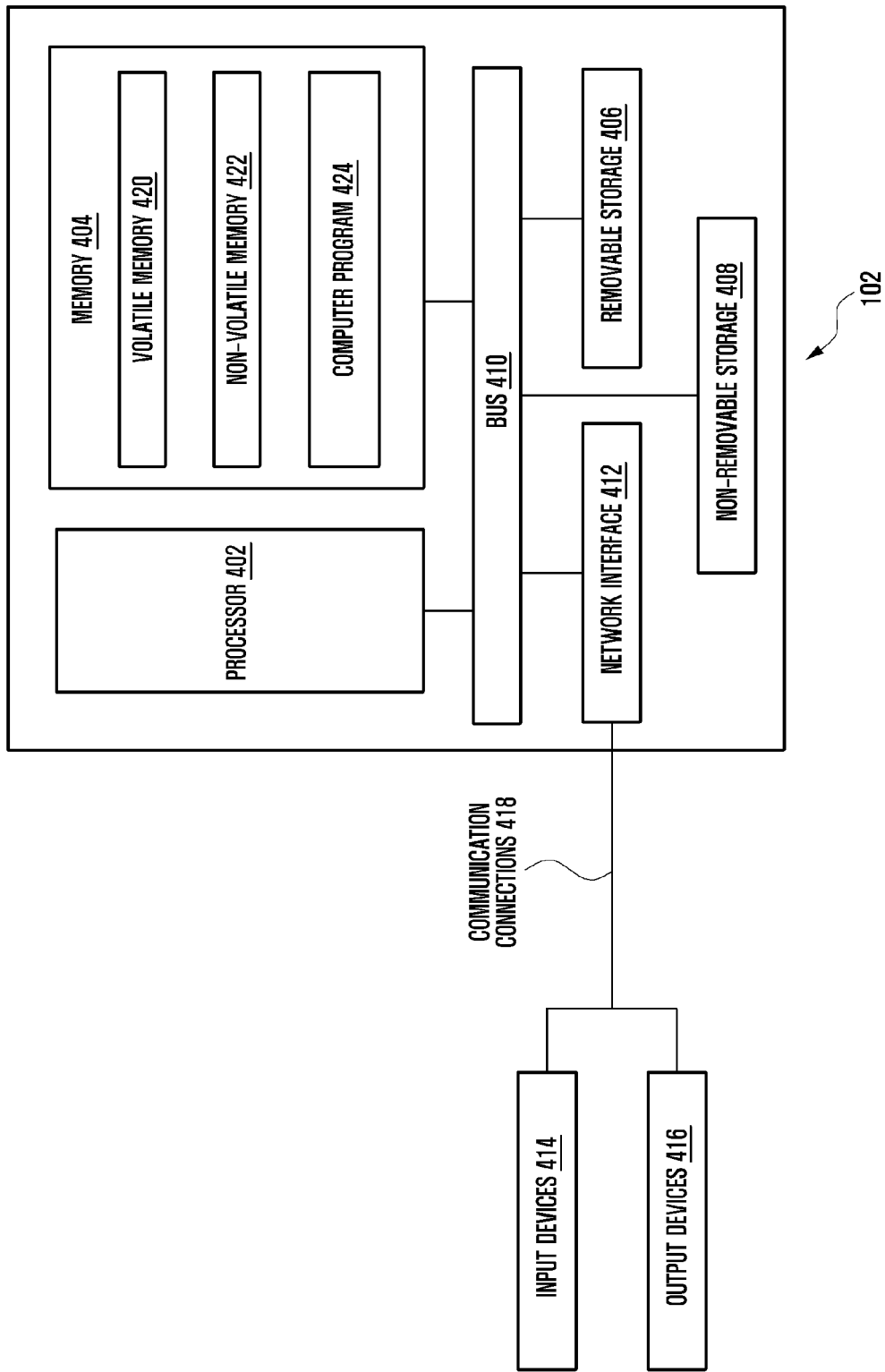
FIG. 4 is an example of the base station showing various components for implementing embodiments of the present subject matter.

FIG. 4 shows an example of the base station 102 for implementing one or more embodiments of the present subject matter. FIG. 4 and the following discussion are intended to provide a brief, general description of the suitable base station 102 in which certain embodiments of the inventive concepts contained herein may be implemented.

The base station 102 may include a processor 402, memory 404, a removable storage 406, and a non-removable storage 408. The base station 102 additionally includes a bus 410 and a network interface 412. The base station 102 may include or have access to one or more user input devices 414, one or more output devices 416, and one or more communication connections 418 such as a network interface card or a universal serial bus connection. The one or more user input devices 414 may be keyboard, mouse, and the like. The one or more output devices 416 may be a display of the base station 102. The communication connections 418 may include a wireless communication network such as UTRAN.

The memory 404 may include volatile memory 420 and non-volatile memory 422. A variety of computer-readable storage media may be stored in and accessed from the memory elements of the base station 102, such as the volatile memory 420 and the non-volatile memory 422, the removable storage 406 and the non-removable storage 408. Computer memory elements may include any suitable memory device(s) for storing data and machine-readable instructions, such as read only memory, random access memory, erasable programmable read only memory, electrically erasable programmable read only memory, hard drive, removable media drive for handling compact disks, digital video disks, diskettes, magnetic tape cartridges, memory cards, Memory Sticks™, and the like.

The processor 402, as used herein, means any type of computational circuit, such as, but not limited to, a microprocessor, a microcontroller, a complex instruction set computing microprocessor, a reduced instruction set computing microprocessor, a very long instruction word microprocessor, an explicitly parallel instruction computing microprocessor, a graphics processor, a digital signal processor, or any other type of processing circuit. The processor 402 may also include embedded controllers, such as generic or programmable logic devices or arrays, application specific integrated circuits, single-chip computers, smart cards, and the like.

Embodiments of the present subject matter may be implemented in conjunction with program modules, including functions, procedures, data structures, and application programs, for performing tasks, or defining abstract data types or low-level hardware contexts. Machine-readable instructions stored on any of the above-mentioned storage media may be executable by the processor 402 of the base station 102. For example, a computer program 424 may include machine-readable instructions capable of communicating physical cell identifier information associated with a cell, according to the teachings and herein described embodiments of the present subject matter. In one embodiment, the computer program 424 may be included on a compact disk-read only memory (CD-ROM) and loaded from the CD-ROM to a hard drive in the non-volatile memory 422. The machine-readable instructions may cause the computing device 401 to encode according to the various embodiments of the present subject matter.

Figure 5:
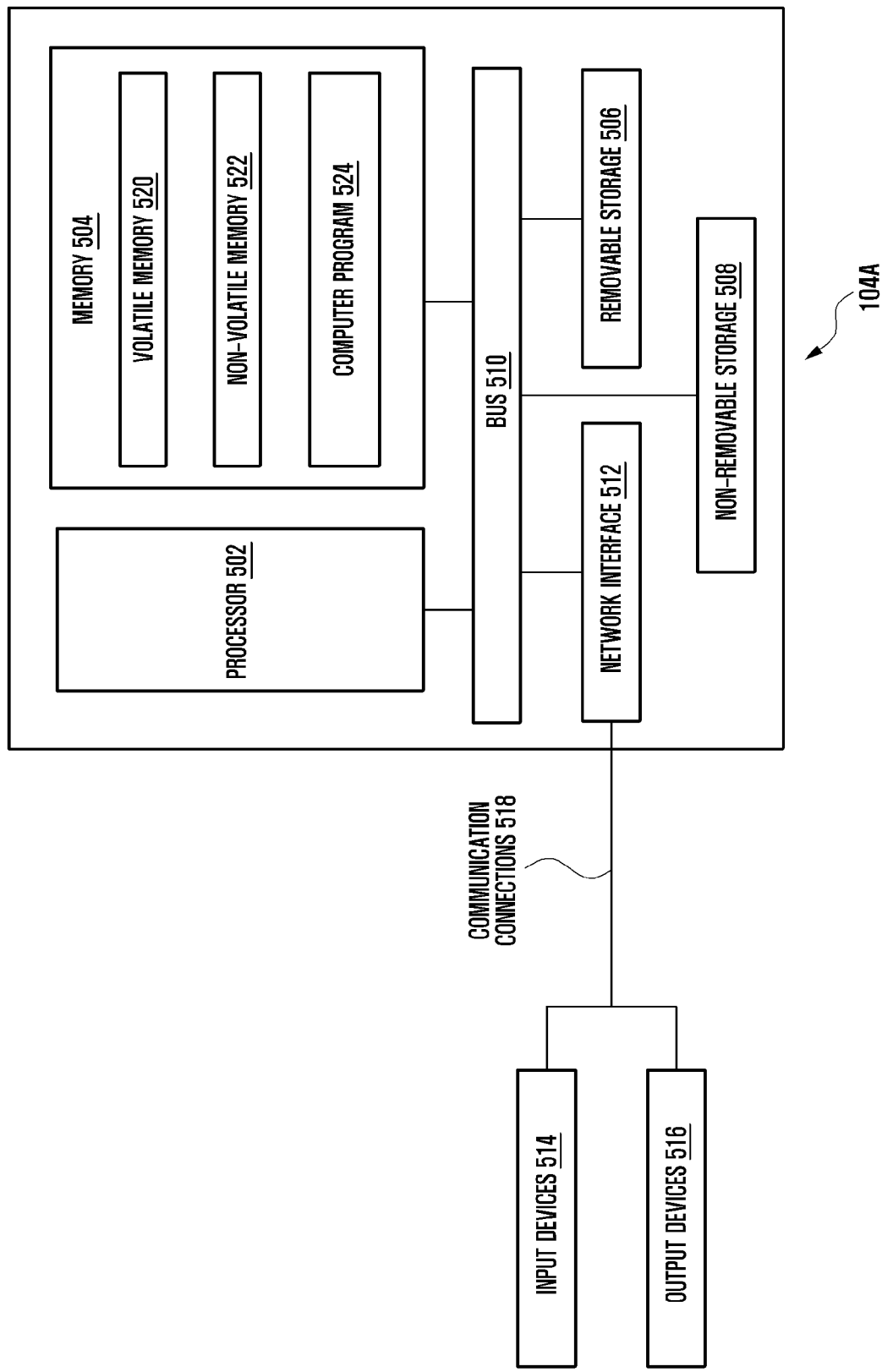
FIG. 5 is an example of the mobile station showing various components for implementing embodiments of the present subject matter.

FIG. 5 shows an example of the mobile station 104A for implementing one or more embodiments of the present subject matter. FIG. 5 and the following discussion are intended to provide a brief, general description of the suitable mobile station 104A in which certain embodiments of the inventive concepts contained herein may be implemented.

The mobile station 104A may include a processor 502, memory 504, a removable storage 506, and a non-removable storage 508. The mobile station 104A additionally includes a bus 510 and a network interface 512. The mobile station 104A may include or have access to one or more user input devices 514, one or more output devices 516, and one or more communication connections 518 such as a network interface card or a universal serial bus connection. The one or more user input devices 514 may be keyboard, mouse, and the like. The one or more output devices 516 may be a display of the mobile station 104A. The communication connections 518 may include a wireless communication network such as UTRAN.

The memory 504 may include volatile memory 520 and non-volatile memory 522. A variety of computer-readable storage media may be stored in and accessed from the memory elements of the mobile station 104A, such as the volatile memory 520 and the non-volatile memory 522, the removable storage 506 and the non-removable storage 508. Computer memory elements may include any suitable memory device(s) for storing data and machine-readable instructions, such as read only memory, random access memory, erasable programmable read only memory, electrically erasable programmable read only memory, hard drive, removable media drive for handling compact disks, digital video disks, diskettes, magnetic tape cartridges, memory cards, Memory Sticks™, and the like.

The processor 502, as used herein, means any type of computational circuit, such as, but not limited to, a microprocessor, a microcontroller, a complex instruction set computing microprocessor, a reduced instruction set computing microprocessor, a very long instruction word microprocessor, an explicitly parallel instruction computing microprocessor, a graphics processor, a digital signal processor, or any other type of processing circuit. The processor 502 may also include embedded controllers, such as generic or programmable logic devices or arrays, application specific integrated circuits, single-chip computers, smart cards, and the like.

Embodiments of the present subject matter may be implemented in conjunction with program modules, including functions, procedures, data structures, and application programs, for performing tasks, or defining abstract data types or low-level hardware contexts. Machine-readable instructions stored on any of the above-mentioned storage media may be executable by the processor 502 of the mobile station 104A. For example, a computer program 524 may include machine-readable instructions capable of communicating physical cell identifier information associated with a cell, according to the teachings and herein described embodiments of the present subject matter. In one embodiment, the computer program 524 may be included on a compact disk-read only memory (CD-ROM) and loaded from the CD-ROM to a hard drive in the non-volatile memory 522. The machine-readable instructions may cause the computing device 501 to encode according to the various embodiments of the present subject matter.

Although the present embodiments have been described with reference to specific example embodiments, it will be evident that various modifications and changes may be made to these embodiments without departing from the broader spirit and scope of the various embodiments. Furthermore, the various devices, modules, analyzers, generators, and the like described herein may be enabled and operated using hardware circuitry, for example, complementary metal oxide semiconductor based logic circuitry, firmware, software and/or any combination of hardware, firmware, and/or software embodied in a machine readable medium. For example, the various electrical structure and methods may be embodied using transistors, logic gates, and electrical circuits, such as application specific integrated circuit.

We claim:

1. A method of a base station for communicating physical cell identifier information to at least one mobile station, wherein the at least one mobile station is served by the base station, comprising:

detecting a need to change a physical cell identifier associated with a cell in a telecommunication network used for serving the at least one mobile station;

communicating physical cell identifier information to the at least one mobile station based on the detected need to change the physical cell identifier;

employing another physical cell identifier associated with the cell in the telecommunication network based on the physical cell identifier information communicated to the at least one mobile station, wherein the physical cell identifier information is communicated in one or more modification periods, and wherein said another physical cell identifier is employed at a boundary of one of the one or more modification periods; and continue serving the at least one mobile station based on the employed said another physical cell identifier.

2. The method of claim 1, wherein the physical cell identifier information comprises at least one of a frequency information, and one of physical cell identifier and a primary scrambling code.

3. The method of claim 1, wherein communicating the physical cell identifier information to the at least one mobile station based on the detected need to change the physical cell identifier comprises:
generating a message indicating a change in system information based on the detected need to change the physical cell identifier;
sending the message indicating the change in the system information to the at least one mobile station during a first modification period;
generating a system information block including another physical cell identifier based on the change in the system information; and
sending the system information block including said another physical cell identifier to the at least one mobile station during a second modification period substantially following the first modification period.

4. The method of claim 3, wherein employing said another physical cell identifier associated with the cell in the telecommunication network based on the physical cell identifier information communicated to the at least one mobile station comprises:
employing said another physical cell identifier associated with the cell in the telecommunication network at the end of the second modification period.

5. The method of claim 1, wherein communicating the physical cell identifier information to the at least one mobile station based on the detected need to change the physical cell identifier comprises:
generating a message indicating a change of physical cell identifier and said another physical cell identifier associated with the cell in the telecommunication network based on detected need to change the physical cell identifier; and
sending the message indicating the change of the physical cell identifier and said another physical cell identifier to the at least one mobile station during a first modification period.

6. The method of claim 5, wherein employing said another physical cell identifier associated with the cell in the telecommunication network based on the physical cell identifier information communicated to the at least one mobile station comprises:
employing said another physical cell identifier associated with the cell in the telecommunication network at the end of the first modification period.

7. The method of claim 3 or 5, wherein the message comprises a paging message.

8. The method of claim 1 in the form of a non-transitory computer-readable storage medium having instructions stored therein to perform the method of claim 1.

9. A method of a mobile station for processing physical cell identifier information associated with a cell in a telecommunication network, comprising:
receiving physical cell identifier information indicating a change of a physical cell identifier associated with a cell in a telecommunication network from a base station of the telecommunication network, wherein the mobile station is served by the base station using the physical cell identifier;
employing another physical cell identifier associated with the cell in the telecommunication network based on the received physical cell identifier information, wherein the physical cell identifier information is received in one or more modification periods, and wherein the said another physical cell identifier is employed at a boundary of one of the one or more modification periods; and
detecting the base station using the employed said another physical cell identifier.

10. The method of claim 9, wherein the physical cell identifier information comprises at least one of frequency information, and one of physical cell identifier and a primary scrambling code.

11. The method of claim 9, wherein receiving the physical cell identifier information indicating the change of the physical cell identifier associated with the cell in the telecommunication network from the base station of the telecommunication network comprises:
receiving a message indicating a change of physical cell identifier from the base station during a first modification period; and
receiving a system information block including said another physical cell identifier from the base station during a second modification period substantially following the first modification period.

12. The method of claim 11, wherein employing said another physical cell identifier associated with the cell in the telecommunication network based on the received physical cell identifier information comprises:
employing another physical cell identifier associated with the cell in the telecommunication network at the end of the second modification period.

13. The method of claim 9, wherein receiving the physical cell identifier information indicating the change of the physical cell identifier associated with the cell in the telecommunication network from the base station of the telecommunication network comprises:
receiving a message indicating a change of a physical cell identifier and another physical cell identifier associated with the cell in the telecommunication network from the base station during a first modification period.

14. The method of claim 13, wherein employing said another physical cell identifier associated with the cell in the telecommunication network based on the received physical cell identifier information comprises:
employing another physical cell identifier associated with said another cell in the telecommunication network at the end of the first modification period.

15. The method of claim 11 or 13, wherein the message comprises a paging message.

16. The method of claim 9 in the form of non-transitory computer-readable storage medium having instructions stored therein to perform the method of claim 9.

17. A base station of a telecommunication network for communicating physical cell identifier information associated with a cell to at least one mobile station, comprising:
a processor; and
memory coupled to the processor and temporarily configured to store instructions capable of:
detecting a need to change a physical cell identifier associated with a cell in a telecommunication network used for serving the at least one mobile station;
communicating physical cell identifier information to the at least one mobile station based on the detected need to change the physical cell identifier;
employing another physical cell identifier associated with another cell in the telecommunication network based on the physical cell identifier information communicated to the at least one mobile station, wherein the physical cell identifier information is communicated in one or more modification periods, and wherein said another physical cell identifier is employed at a boundary of one of the one or more modification periods; and continue serving the at least one mobile station based on the employed said another physical cell identifier.

18. The base station of claim 17, wherein the physical cell identifier information comprises at least one of frequency information, and one of physical cell identifier and a primary scrambling code.

19. The base station of claim 17, wherein the instructions to communicate the physical cell identifier information to the at least one mobile station based on the detected need to change the physical cell identifier comprises:

generating a message indicating a change in system information based on the detected need to change the physical cell identifier;

sending the message indicating the change in the system information to the at least one mobile station during a first modification period;

generating a system information block including another physical cell identifier based on the change in the system information; and sending the system information block including said another physical cell identifier to the at least one mobile station during a second modification period substantially following the first modification period.

20. The base station of claim 19, wherein the instructions to employ said another physical cell identifier associated with the cell in the telecommunication network based on the physical cell identifier information communicated to the at least one mobile station comprises:

employing said another physical cell identifier associated with the cell in the telecommunication network at the end of the second modification period.

21. The base station of claim 17, wherein the instructions to communicate the physical cell identifier information to the at least one mobile station based on the detected need to change the physical cell identifier comprises:

generating a message indicating a change of physical cell identifier and said another physical cell identifier associated with the in the telecommunication network based on detected need to change the physical cell identifier; and sending the message indicating the change of the physical cell identifier and said another physical cell identifier to the at least one mobile station during a first modification period.

22. The base station of claim 21, wherein the instructions to employ said another physical cell identifier associated with the cell in the telecommunication network based on the physical cell identifier information communicated to the at least one mobile station comprises:

employing said another physical cell identifier associated with the cell in the telecommunication network at the end of the first modification period.

23. The base station of claim 19 or 21, wherein the message comprises a paging message.

24. A mobile station for processing physical cell identifier information received from a base station, comprising:

a processor; and memory coupled to the processor and temporarily configured to store instructions capable of:

receiving physical cell identifier information indicating a change of a physical cell identifier associated with a cell in a telecommunication network from a base station of the telecommunication network, wherein the mobile station is served by the base station using the physical cell identifier;

employing another physical cell identifier associated with the cell in the telecommunication network based on the received physical cell identifier information, wherein the physical cell identifier information is received in one or more modification periods, and wherein the said another physical cell identifier is employed at a boundary of one of the one or more modification periods; and detecting the base station using the employed said another physical cell identifier.

25. The mobile station of claim 24, wherein the physical cell identifier information comprises at least one of frequency information, and one of physical cell identifier and a primary scrambling code.

26. The mobile station of claim 24, wherein the instructions to receive the physical cell identifier information indicating the change of the physical cell identifier associated with the cell in the telecommunication network from the base station of the telecommunication network comprises:

receiving a message indicating a change of physical cell identifier from the base station during a first modification period; and receiving a system information block including said another physical cell identifier from the base station during a second modification period substantially following the first modification period.

27. The mobile station of claim 26, wherein the instructions to employ said another physical cell identifier associated with the cell in the telecommunication network based on the received physical cell identifier information comprises:

employing another physical cell identifier associated with the cell in the telecommunication network at the end of the second modification period.

28. The mobile station of claim 24, wherein the instructions to receive the physical cell identifier information indicating the change of the physical cell identifier associated with the cell in the telecommunication network from the base station of the telecommunication network comprises:

receiving a message indicating a change of a physical cell identifier and another physical cell identifier associated with the cell in the telecommunication network from the base station during a first modification period.

29. The mobile station of claim 28, wherein the instructions to employ said another physical cell identifier associated with the cell in the telecommunication network based on the received physical cell identifier information comprises:

employing another physical cell identifier associated with the cell in the telecommunication network at the end of the first modification period.

30. The mobile station of claim 26 or 28, wherein the message comprises a paging message.

* * * * *